United States Patent [19]

Sell

[11] 4,453,430
[45] Jun. 12, 1984

[54] MULTIPLE-SPEED WINCH OR DRUM DRIVE

[75] Inventor: Leslie J. Sell, Langley, Canada

[73] Assignee: Paccar of Canada Ltd., Quebec, Canada

[21] Appl. No.: 196,687

[22] Filed: Oct. 14, 1980

[51] Int. Cl.³ ............................................. F16H 57/10
[52] U.S. Cl. ........................................ 74/770; 74/740; 74/765; 74/789
[58] Field of Search ................. 74/740, 764, 765, 789, 74/770, 785, 752 C

[56] References Cited

U.S. PATENT DOCUMENTS

| | | | |
|---|---|---|---|
| 2,053,055 | 9/1936 | Wadd | 74/785 |
| 2,756,600 | 7/1956 | Kamlukin et al. | 74/740 |
| 2,869,400 | 1/1959 | Langdon | 74/765 |
| 2,981,125 | 4/1961 | Dodge | 74/752 C |
| 3,014,383 | 12/1961 | Flinn | 74/752 C |
| 3,055,237 | 9/1962 | Magnuson | 74/789 |
| 3,115,204 | 12/1963 | Dence | 74/785 |
| 3,167,970 | 2/1965 | Wagner et al. | 74/752 C |
| 3,308,686 | 3/1967 | Magg et al. | 74/785 |
| 3,383,954 | 5/1968 | McFarland | 74/789 |
| 3,741,037 | 6/1973 | Piret | 74/789 |
| 4,192,409 | 3/1980 | Ueda | 74/768 |

FOREIGN PATENT DOCUMENTS

| | | | |
|---|---|---|---|
| 0545064 | 8/1957 | Canada | 74/765 |
| 2079531 | 11/1971 | France | |
| 2085099 | 4/1982 | United Kingdom | 74/765 |

*Primary Examiner*—Lawrence J. Staab
*Assistant Examiner*—Joseph M. Rolnicki
*Attorney, Agent, or Firm*—Seed and Berry

[57] ABSTRACT

A transmission suitable for use in a winch, wire line drum, or other vertical hoisting device is provided with independently actuatable disc clutches for actuating various planetary gear sets to vary the speed through at least three speed ranges. The gear sets and clutches are immersed in oil, and control means are provided to energize the clutches always in sets of two so that only one disc clutch remains disengaged to minimize the viscous drag of the disengaged clutch in the oil. The planetary sets and clutches form the transmission between an input shaft and an output drive assembly. In the preferred embodiment, a final multiple-speed drive assembly is provided to increase the three-speed ratios to six-speed ratios to obtain a wide speed range.

5 Claims, 4 Drawing Figures

MULTIPLE-SPEED WINCH OR DRUM DRIVE

BACKGROUND OF THE INVENTION

1. Field of the Invention

This invention pertains to hoisting devices and particularly to winch or line drum hoisting devices in which an abnormally long line must be moved vertically through a large range of speeds.

2. Description of the Prior Art

Long line winch or drum drives have generally been costly to manufacture and frequently have required several stages of external transmissions to achieve adequate load capacity and a high range of speed ratios. In other instances, a variable-speed input motor was required to get variable speed ranges. In addition to these prior art devices being expensive, they frequently were impractical in use in remote areas, such as at oilfields and the like.

SUMMARY OF THE INVENTION

It is an object of this invention to provide a transmission for winches, line drums or the like which uses disc clutch assemblies and planetary gear sets for obtaining multiple speed ranges with minimum viscosity drag losses in operation.

It is another object of this invention to provide an improved multiple-speed planetary gear set and disc clutch drive transmission for hoisting devices.

It is still another object of this invention to provide a line drum drive having low internal viscous drag losses and a relatively high selectable speed range for handling abnormally long lines in a wide variety of speeds.

Basically, these objects are obtained by providing a transmission between a powered input shaft and an output drive assembly which includes sets of planetary gears that are selectively actuatable into various gear ratios to provide at least three speeds. These planetary gear sets are actuated by at least three conventional disc clutches which are lubricated by oil and are energized in a selective sequence so as to always engage at least two of the three disc clutches so that only one clutch remains disengaged. In the preferred embodiment, the disengaged disc clutch is in the lowest spaced range and also has its discs operating at the lowest rotational rpm to further minimize viscous drag.

As is readily apparent, the frictional losses due to oil drag between the clutch plates and the divider plates when not engaged is reduced over that of prior art transmissions. Such frictional losses in prior art devices can be considerable, particularly when there are multiple overrunning sets of clutch plates and these clutch plates are running at high speeds.

While the transmission has general application for winches, it advantageously is employed in combination with a final drive assembly that has additional multiple speed ranges when operated with abnormally long lines, such as for a cable drum drive on oil well logging equipment. In this type of equipment, in excess of thirty thousand feet of line can be lowered and must be capable of moving at extremely slow speeds for surveying the interior of the oil well as well as high speeds for rapid retrieval or lowering of the line. By the use of these six speed ranges selectively available through the combination of the three-speed transmission and two-speed final drive assembly, these speed ratios can be achieved and, in the low speed range, provide sufficient power for carrying the weight of the fully extended line. In addition, it is advantageously provided to place all of the gear sets for all six speed ranges in a housing as an integral unit.

For oil well logging applications, the basic requirement of the cable drum drive is the ability to be able to raise and lower the logging tool and provide widely varying speeds which can be easily controllable within fine limits. The drive must also provide sufficient torque to compensate for the load on the drum due to the weight of the cable that has been paid out, together with the weight of the logging tool. Typical operation, for example, may require the cable to move at two feet per minute at the twenty-nine thousand foot level and as high as 1200 feet per minute at the five thousand foot level. High cable retrieval rates must be provided to assure that the logging tool may be retracted rapidly enough ahead of the ingress of gases and fluids released as a result of a perforating operation. The drive of this invention combines together a hydrostatic drive motor, the multiple-speed planetary transmission, a high-low range planetary final drive, and a fixed planetary reduction into a single compact unit. Compared to this, the ratio of minimum to maximum speed in hydraulic motors, as in the prior art, at full load is in the region of 10:1 for smooth, reliable performance, and, therefore, hydraulic drives are limited in overall speed range. The use of stepped planetary reductions as in this invention enables the overall cable speed range to be extended to 600:1. The motor speed range is able to be increased to 25:1 in this application since at normal low, slow speed running, increased mechanical reduction will greatly reduce the operating pressure.

A further advantage of the instant invention is that it provides convenient means for disengaging most of the planetary reduction within the planetary transmission from the final drive output shaft to give a free-spool mode of operation. This is done at the high-low range reduction in the final drive assembly, and it allows the logging tool to fall freely into a well through slurry without the need for "powering out" the line. This eliminates the possibility of over-spooling the cable at high speeds if sudden resistance on the logging tool is encountered.

DETAILED DESCRIPTION OF THE PREFERRED EMBODIMENT

Figure 1A:
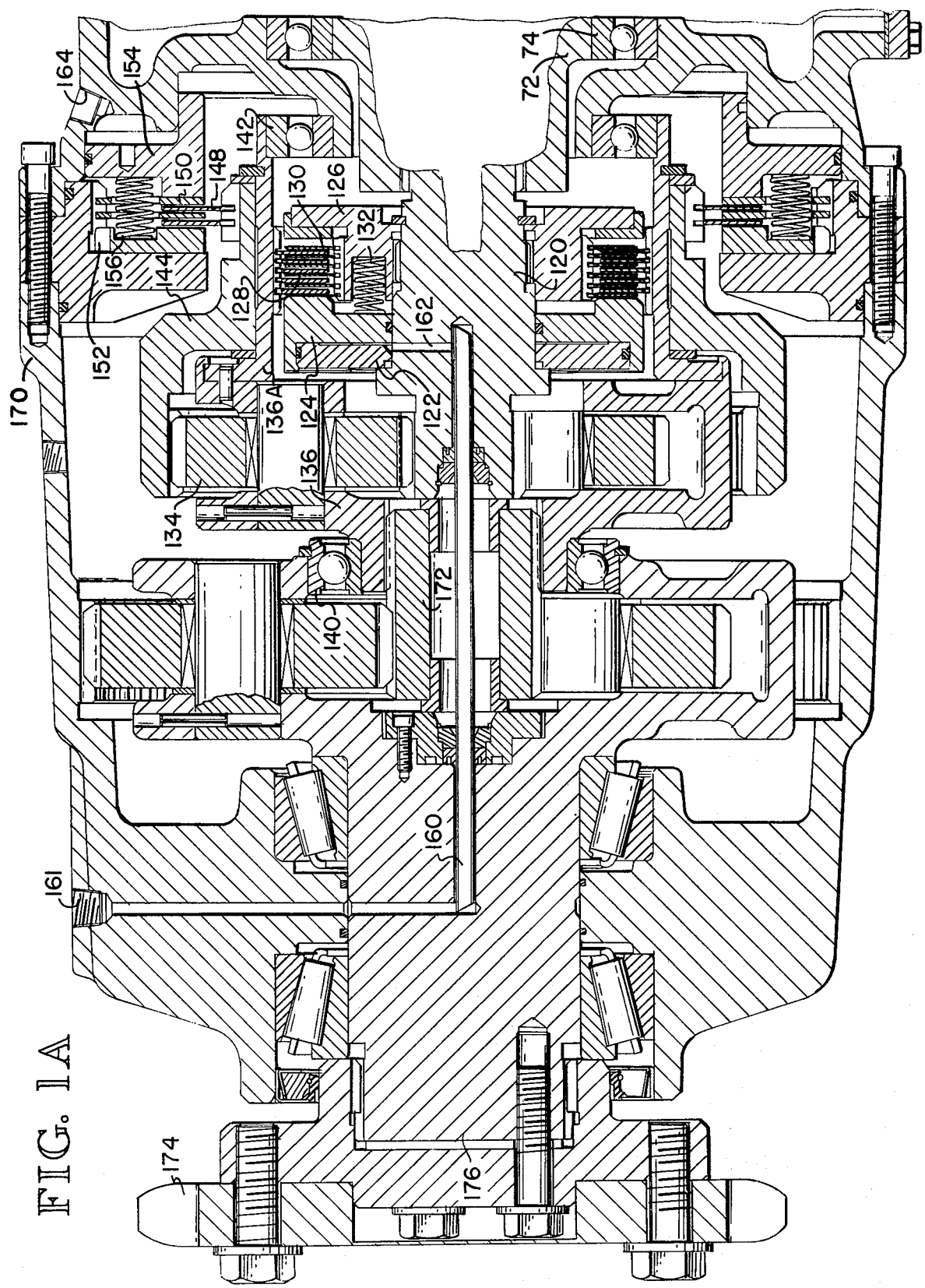
FIGS. 1A–1C are longitudinal sections taken through the drum drive embodying the principles of the invention.
Figure 1B:
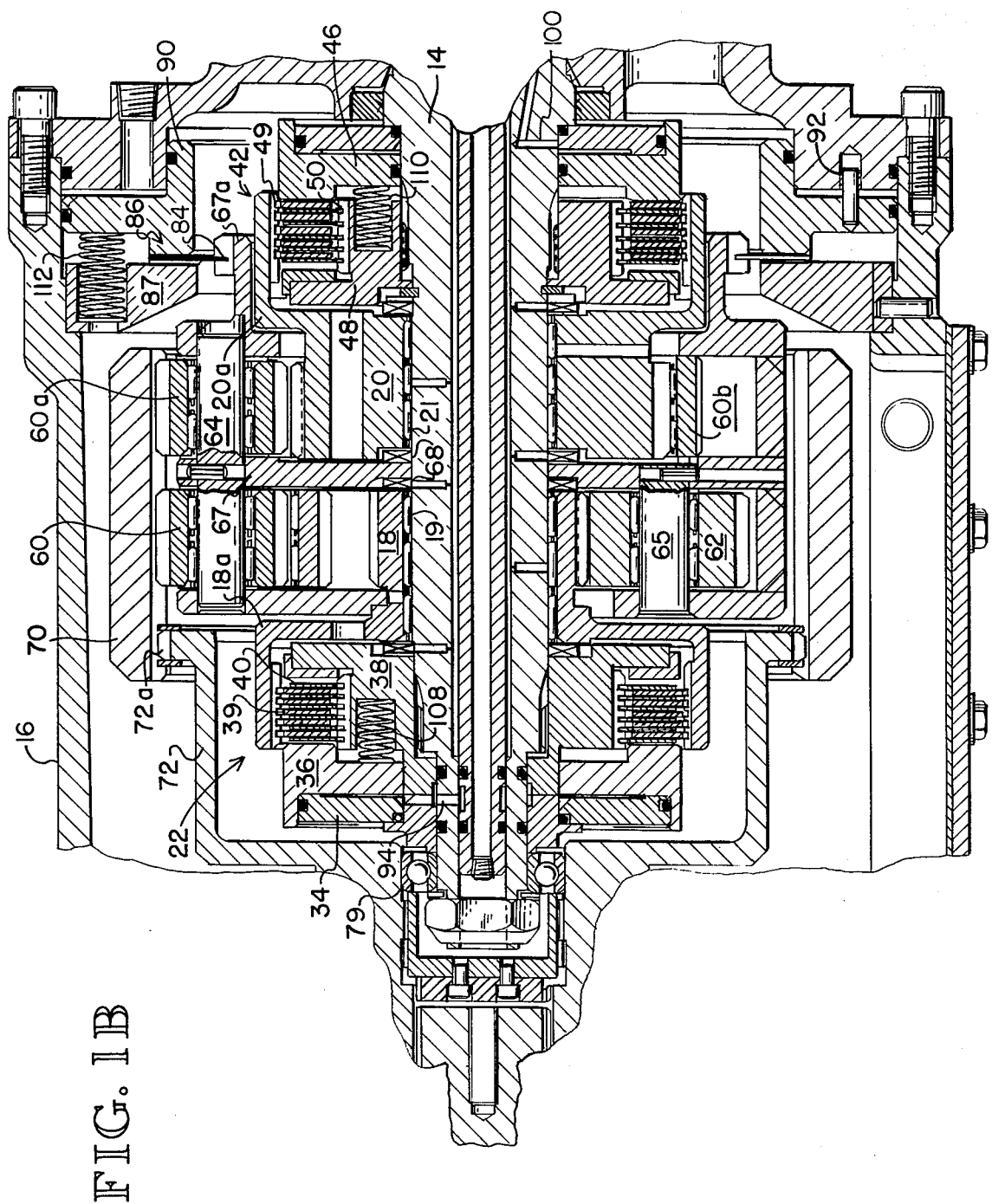
Figure 1C:
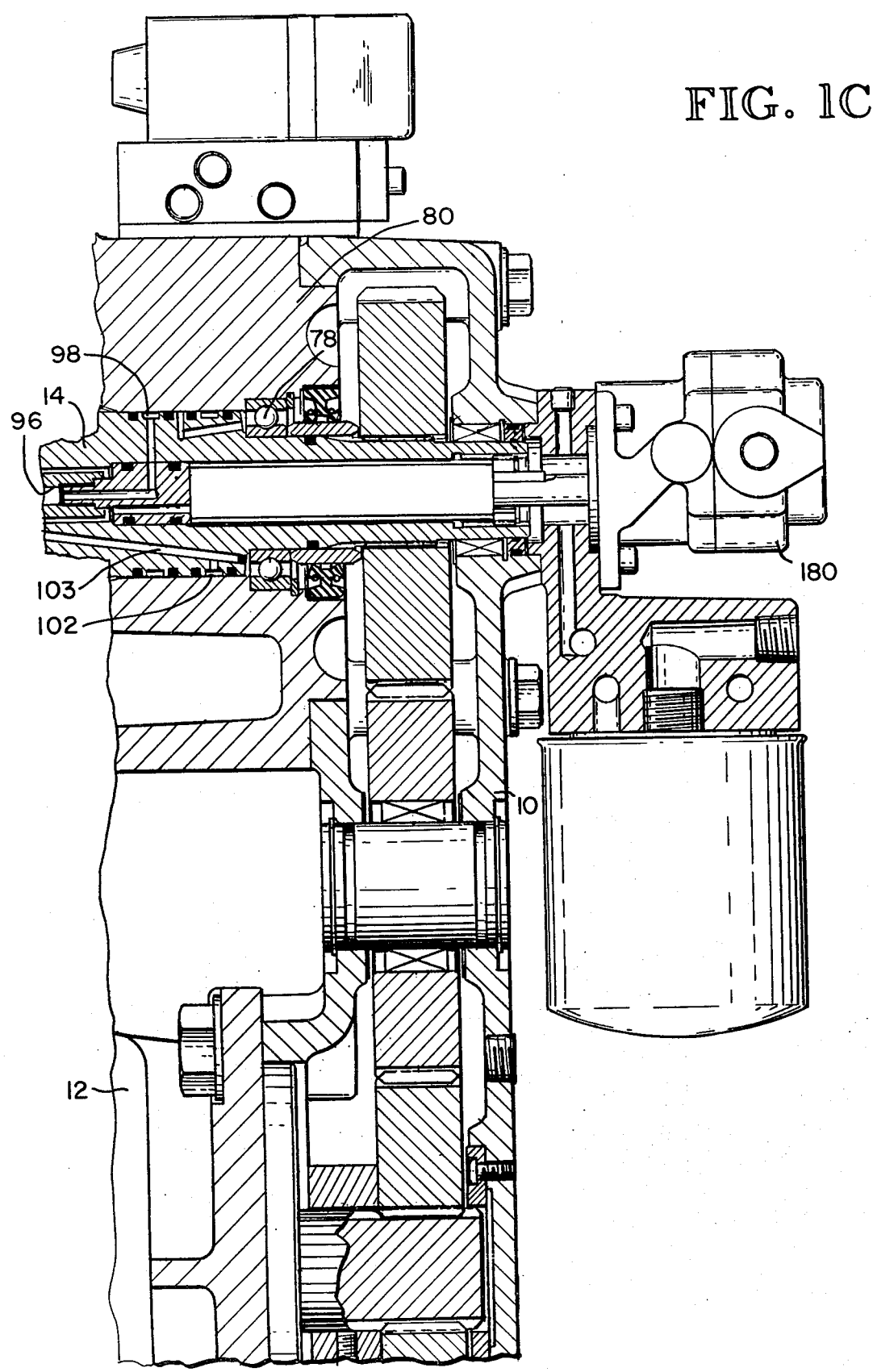

As best shown in FIGS. 1A–1C, the winch or drum drive consists of three major subassemblies. The subassembly in FIG. 1C comprises an adaptor housing 10 to which a hydraulic motor 12 is attached. Drive from the motor shaft is transmitted by a train of spur gears to a sun gear shaft 14 of a three-spaced transmission, which is designated generally as the subassembly in FIG. 1B. The third major subassembly is in FIG. 1A.

The multiple-speed winch, preferably with three speed ranges, includes the input shaft 14 which is rotatably mounted in housing 16. A first sun gear 18 is rotatably mounted on the shaft 14 by needle bearings 19. A second sun gear 20 is rotatably mounted on the shaft 14 by needle bearings 21. A first clutch assembly 22 includes piston support 34, piston 36, clutch plate support 38, clutch plate dividers 39, and clutch plates 40 splined by clutch support 38 to sun gear shaft 14. The clutch plate dividers are splined to the hub 18a of first sun gear 18.

A second clutch assembly 42 is splined to the sun gear shaft 14 in a similar manner and consists of components that are identical to those of clutch assembly 22. Briefly, the teeth of clutch plate dividers 49 are splined to the hub 20a of second sun gear 20, and the clutch plates 50 are splined to the shaft 14 by clutch support 48. Planet gears 60, 60a, and 62 are carried on planet pins 64 and 65 in a divided planet hub 67 which is loosely piloted on sun gear shaft 14 and located axially by the sun gears 18 and 20.

Thrust bearings 68 separate the clutch assemblies 22 and 42, and the planet hub 67.

In the embodiment illustrated and by way of example, sun gear 18 has twenty-seven teeth and meshes with idler planet gear 62, which has twenty-one teeth, which meshes with planet gear 60, which has sixteen teeth, which meshes with internal gear 70, which has eighty-four teeth.

Sun gear 20 has forty-eight teeth and meshes with an idler planet gear (not shown), which has sixteen teeth, which meshes with planet gear 60a, which has sixteen teeth, which also meshes with internal gear 70.

Internal gear 70 is secured to an output connector 72 by teeth 72a, which is mounted in a bearing 74 in the housing 16. The sun gear shaft assembly, consisting of clutch assemblies 22 and 42, and planet hub assembly is supported on a bearing 78 in end cover 80 and bearing 79 in output connector 72. Planet hub 67 has extension 67a which is splined to a plate 84 that is part of a brake assembly 86. Clutch assemblies 22 and 42, and brake assembly 86, will also be referred to as "friction coupling assemblies." Plate 84 passes between a backup plate 87 keyed to housing 16 and a piston 90 which is keyed to the end cover 80 by a pin 92.

Pressurized oil is supplied to clutch assembly 22 through ports 94, which communicates with an axial port 96 and thence to a radial port 98. Pressurized oil is supplied to clutch assembly 42 by port 100, which communicates with a port 102 via bore 103. Pressurized oil is supplied to clutch assembly 86 by (not shown in drawing).

The compression springs 108 in clutch assembly 22, springs 110 in clutch assembly 42, and springs 112 in clutch assembly 86 respectively hold piston 36 away from friction plates 40, piston 46 away from clutch plates 50, and piston 90 away from clutch plate 84. This allows the sun gears 18 and 20 to freely rotate in the clutch assemblies 22 and 42 in the absence of pressurized oil. Similarly, in the absence of pressurized oil, planet hub 67 and its extension 67a may freely rotate.

For Low Gear Operation—Pressurized oil is supplied to piston 36 in clutch assembly 22, causing sun gear 18 to be locked to the sun gear shaft 14 through the clamped clutch plates 40 and dividers 39. Pressurized oil is fed also, at the same time, to piston 90, causing planet hub 67 to be locked to housing 16 through clamped friction plate 84. One revolution of the motor shaft causes the sun gear shaft 14, together with the clutch assemblies 22 and 42 and sun gear 18, to also rotate one revolution in the same direction. Sun gear 18 drives internal gear 70 and output connector 72 at reduced speed in the same direction through idler planet gear 62 and planet gear 60 in stationary planet hub 67. Speed of the ring gear 70 is 84/27 times less than that of the input shaft 14.

Since piston 46 of clutch assembly 42 is not pressurized, sun gear 20 is free to rotate at a speed independent to that of sun gear 18. Rotation of ring gear 70 causes sun gear 20 to be driven in the same direction at a speed that is 84/48 times faster than ring gear 70, through planet gear 60a, and idler gear 60b. The absolute speed of sun gear 20 is therefore 27/84 × 84/48 or 0.5625 times the speed of the sun gear shaft. Since the clutch assembly 42 also rotates with the sun gear shaft, the speed of sun gear 20, relative to the clutch components, is 1−0.5625 which is 0.4375 times the speed of the sun gear shaft. As an example, in low gear with 3,000 rpm input to the sun gear shaft 14, the overrunning clutch speed of clutch assembly 42 is 3,000×0.4375=1,312.5 rpm. This relatively low speed between the clutch plates and the divider plates of clutch assembly 42 reduces viscous losses to a minimum and provides high efficiency in low gear.

Intermediate Gear Ratio—Pressurized oil is supplied to piston 46 in clutch assembly 42, causing sun gear 20 to be locked to sun gear shaft 14 through the clamped friction plates and dividers. Pressurized oil is fed at the same time to piston 90, causing planet hub 67 to be locked to housing 16 through friction plate 84. One revolution of the sun gear shaft 14 causes clutch assemblies 22 and 42 and sun gear 20 to also rotate one revolution in the same direction. Internal gear 70 is driven at reduced speed in the same direction by sun gear 20 through idler planet 60b and planet gear 60a.

Speed of the ring gear 70 is 84/48 times less than the speed of the sun gear shaft 14.

Since the piston 36 in clutch assembly 22 is not pressurized, sun gear 18 is free to rotate independently to the sun gear shaft 14. Rotation of ring gear 70 causes sun gear 18 to be driven in the same direction at a speed that is 84/27 times faster than the ring gear through the planet gear 60 and the idler planet gear 62. The absolute speed of sun gear 18 is therefore 48/84 times 84/27, or 1.778 times the speed of the sun gear shaft. Since the clutch assembly 22 also rotates with the sun gear shaft, the speed of sun gear 18 relative to the clutch components is 1.778 minus 1, which is 0.778 times the speed of the sun gear shaft. For example, in intermediate gear with 3,000 rpm input to the sun gear shaft 14, the overrunning clutch speed of clutch assembly 22 is 3,000×0.778=2,334 rpm.

High Gear Ratio—Pressurized oil is supplied to both clutch assemblies 22 and 42, causing sun gears 18 and 20 to become locked to the sun gear shaft 14. Since both sun gears commonly mesh through their respective planets with internal gear 70, the difference in their ratios causes interaction between the two; and thus, the sun gear shaft assembly, the planet hub assembly, and the internal gear lock together. Therefore, the output speed and the overrunning clutch speed is one times the speed of the sun gear shaft. Clutch piston 90 is not pressurized, and clutch plate 84 rotates at motor speed. Since it only has two friction surfaces, the resistance to rotation is low.

The final drive assembly is a two-speed unit shown in FIG. 1A. The output connector 72 of the three-speed transmission is connected to a sun gear 120 which carries a first final clutch assembly comprised of backup ring 122, piston 124, clutch support 126, divider plates 128, friction plates 130, and piston return springs 132.

Sun gear 120 drives planet gears 134, which are carried in planet hub 136. The planet hub 136 has an extension 136a which has internal teeth that engage similar teeth on divider plates 128. Planet hub 136 is carried on bearings 140 and 142.

The planet gears 134 engage ring gear 144, which is piloted freely on the planet hub extension 136a. Ring gear 144 engages friction plates 148, which pass between divider plates 150, and piston 154, which is held retracted by return springs 156. Pressurized oil can be supplied to clutch piston 124 through a rotary connection comprised of supply tube 160 and ports 161 and 162. Pressurized oil can be supplied to piston 154 through housing connection 164.

Low Range—When low range in the final drive assembly is selected, pressurized oil is supplied to piston 154 to clamp friction plates 148 and hold the ring gear 144 stationary in the housing 170, which is secured to the main housing 16. Sun gear 120, which is connected to the output of the three-speed transmission, has sixteen teeth and drives planet hub 136 through stationary ring gear 144, which has eighty-three teeth, giving a 6.187:1 reduction in speed. Since pressurized oil is not being supplied to piston 124, sun gear 120 is able to turn freely relative to planet hub 136.

High Range—When high range is selected, pressurized oil is supplied to clutch piston 124, causing sun gear 120 to become locked to planet hub 136 through clamped friction plates 130. Since pressurized oil is not supplied to piston 154, ring gear 144 is free to rotate together with planet hub 136 and sun gear 120 as one unit, giving a 1:1 ratio between the three-speed transmission output and the fixed reduction sun gear 172.

Free Spool—In the free-spool mode, clutch pistons 124 and 154 are not pressurized and, therefore, planet hub 136 and ring gear 144 are both free to turn. Torque on the final output sprocket 174 due to cable load on the drum causes planet hub 176 to rotate, which in turn drives the sun gear 172 at increased speed. Since the hydraulic motor 12 is not being driven, sun gear 120 remains stationary, causing planet hub 136 to drive ring gear 144 at increased speed.

It is understood that the housings 16 and 170 are filled with lubricating oil, which may be supplied to the housing by any suitable means, such as pump 180.

Figure 2:
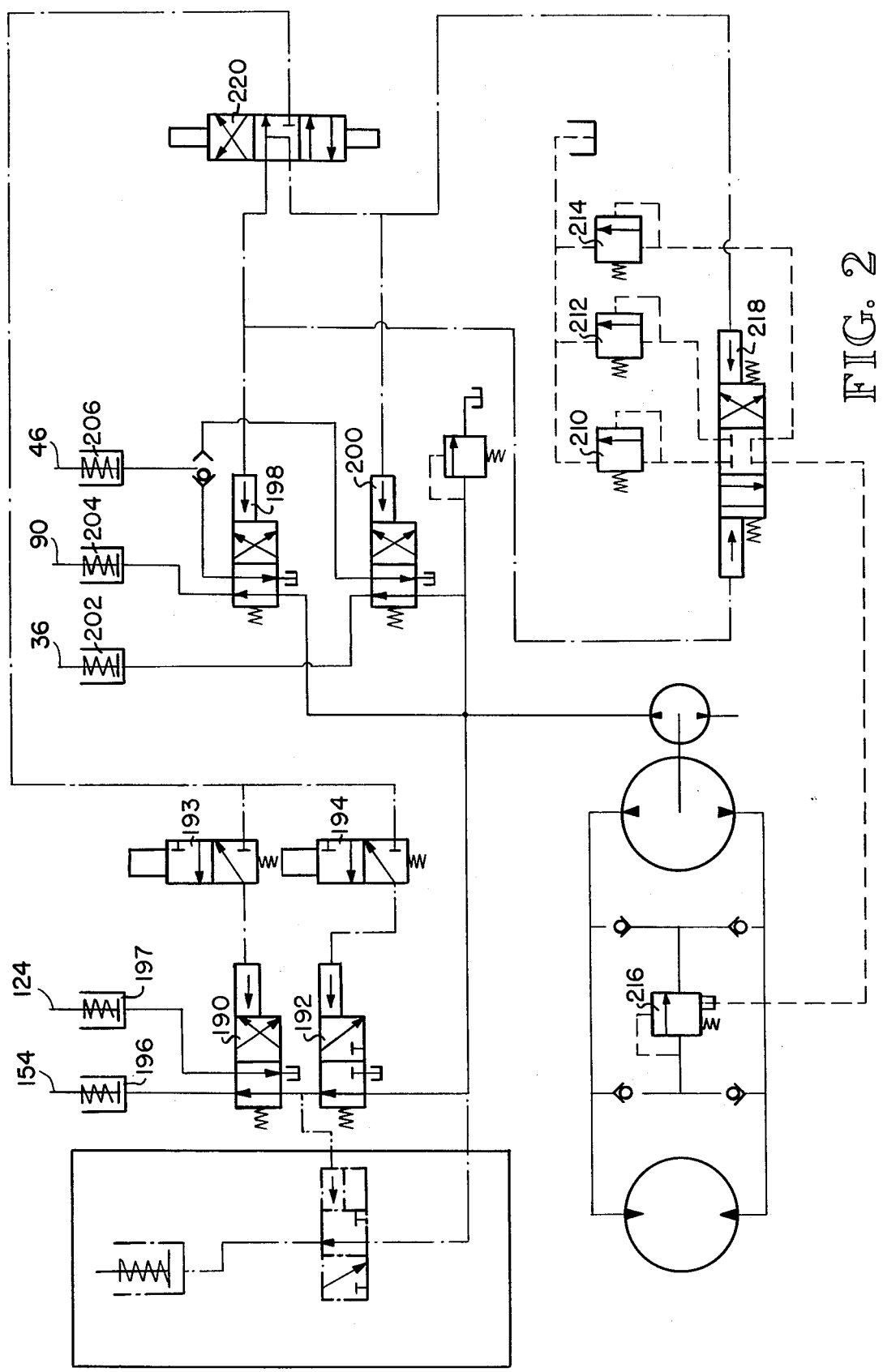
FIG. 2 is a control schematic embodying the principles of the invention.

Control Circuit—Schematic FIG. 2 shows the general control schematic for the transmission.

Valves 190 and 192, control the flow of pressurized oil to clutch pistons 124 and 154 respectively. Valves 198 and 200 control the flow of pressurized oil to clutch pistons 46 and 36 of clutch assemblies 22 and 42 respectively, and also to clutch piston 90.

Absence of pilot signal to any of the control valves causes control valves 198 and 200 to direct pressurized oil to clutch pistons 36 and 90 giving low gear ratio in the 3-speed section, and control valves 190 and 192 to direct pressurized oil to clutch piston 154 to give low range in the 2-speed section.

Pilot signal to control valve 198 causes pressurized oil to be directed to piston 46, venting piston 90 while piston 36 remains pressurized which gives high gear in 3-speed section. Pilot signal to control valve 200 causes pressurized oil to be directed to piston 46, venting piston 36 while piston 90 remains pressurized, which gives intermediate gear in 3-speed section.

Pilot signal to control valve 190 causes pressurized oil to be directed to clutch piston 124 while piston 154 is vented, giving high range in the 2-speed section.

Valves 193, 194, and 220 provide air pilot signals to valves 193, 194, 198, and 200. Pilot signal to valve 192 causes pressurized oil supply to valve 190 to be blocked and pistons 154 and 124 to be vented, which gives free-spooling in the 2-speed section.

Valves 210, 212, and 214 are pilot controls that operate the relief valve 216 of the closed-loop pump/motor circuit. The valves are adjustable and are set to limit the motor output torque for the various speed ranges. Selection of the correct pilot control corresponding to the appropriate speed ratio is automatically accomplished through control valve 218, which is pilot-shifted from the output of a speed control valve 220.

While the details of the invention have been illustrated and described, it should be understood that variations will be apparent to one of ordinary skill in the art. Accordingly, the invention is not to be limited to the specific embodiment illustrated in the drawing.

I claim:

1. A multiple-speed transmission for winches, hoisting drums and the like, comprising:
   a housing,
   an input shaft rotatably supported in said housing,
   means for rotating said input shaft,
   an output drive assembly rotatably supported in said housing,
   first and second planetary drive assemblies in said housing for selectively transmitting power at three speeds in the same direction from three gear ratios between said input shaft and said output drive assembly, said planetary drive assemblies including first, second and third separate, independently actuatable friction coupling assemblies, each having friction members decoupling when spaced and coupling when pressed together,
   an oil supply for lubricating said friction coupling assemblies and causing viscous drag on said spaced friction members, and
   control means for selectively simultaneously disengaging no more than one of said friction coupling assemblies in any gear ratio for reducing friction power losses from said transmission.

2. The transmission of claim 1, the gear ratio in said lowest speed having disengaged the friction coupling assembly with the lowest relative velocity between friction plates of any of the other friction clutch assemblies when each is disengaged, thus providing the lowest friction loss due to viscous drag at the lowest speed for maximizing power output in the lowest speed.

3. The transmission of claim 1, said first planetary drive assembly including said first friction coupling assembly, a first piston for actuating said first friction coupling assembly, a first sun gear rotatably mounted on said input shaft, a ring gear connected to said output drive assembly, and a first planetary gear set carried in a planet hub and meshing with said first sun gear and said ring gear, said first friction coupling assembly operable to lock said first sun gear to said input shaft for rotating said ring gear at one ratio relative to the input shaft when said planet hub is held stationary.

4. The transmission of claim 1, said second planetary drive assembly including said second friction coupling assembly, a second piston for actuating said second friction coupling assembly, a second sun gear, a second planetary gear set carried in a planet hub and meshing with said second sun gear and said ring gear, said second friction coupling assembly operable to lock said second sun gear to said input shaft for rotating said ring gear at a second velocity relative to the input shaft when said planet hub is held stationary.

5. The transmission of claim 1, said planetary drive assemblies including first and second sun gears rotatably mounted on said input shaft, a common ring gear coupled to said output drive assembly, first and second planetary gear sets respectively meshing with said first and second sun gears and said ring gear, first and second friction coupling assemblies actuatable for locking said sun gears to said input shaft, first and second pistons for actuating said respective friction coupling assemblies, a planet hub common to both said planetary gear sets and having an extension, a third friction coupling assembly operable to release said planet hub extension from said housing to produce a direct drive between said ring gear and said input shaft, and a third piston operable to actuate said third friction coupling assembly.

* * * * *